(12) United States Patent
Townsend et al.

(10) Patent No.: US 7,617,445 B1
(45) Date of Patent: Nov. 10, 2009

(54) LOG NOTE SYSTEM FOR DIGITALLY RECORDED AUDIO

(75) Inventors: Steven L. Townsend, Phoenix, AZ (US); Derrill P. Williams, Scottsdale, AZ (US); Neil R. Jones, Woodvale (AU); Stephen J. Fewings, Lathlain (AU); Henry Hickling, West Leederville (AU)

(73) Assignee: FTR PTY. Ltd., Perth (AU)

( * ) Notice: Subject to any disclaimer, the term of this patent is extended or adjusted under 35 U.S.C. 154(b) by 330 days.

(21) Appl. No.: 11/223,342

(22) Filed: Sep. 9, 2005

(51) Int. Cl.
*G06F 13/00* (2006.01)

(52) U.S. Cl. .................. 715/232; 715/201; 715/203; 715/233

(58) Field of Classification Search .............. 715/200, 715/201, 203, 229, 232, 233, 255
See application file for complete search history.

(56) References Cited

U.S. PATENT DOCUMENTS

| | | | |
|---|---|---|---|
| 4,041,467 A | 8/1977 | Cota | |
| 4,424,575 A * | 1/1984 | Clarke et al. | ................ 715/201 |
| 4,924,387 A | 5/1990 | Jeppesen | |
| 5,280,430 A | 1/1994 | Woods | |
| 5,369,704 A | 11/1994 | Bennett | |
| 5,385,475 A * | 1/1995 | Sudman et al. | ......... 434/307 R |
| 5,444,615 A * | 8/1995 | Bennett et al. | .................. 705/8 |
| 5,526,407 A * | 6/1996 | Russell et al. | ............ 379/88.01 |
| 5,564,005 A * | 10/1996 | Weber et al. | ................. 715/863 |
| 5,680,636 A * | 10/1997 | Levine et al. | ................ 715/201 |
| 5,729,741 A | 3/1998 | Liaguno | |
| 5,740,245 A | 4/1998 | Bennett | |
| 5,806,079 A * | 9/1998 | Rivette et al. | ................ 715/210 |
| 5,815,392 A | 9/1998 | Bennett | |
| 5,832,171 A * | 11/1998 | Heist | ............................ 386/46 |
| 5,875,448 A | 2/1999 | Boys | |
| 5,878,186 A | 3/1999 | Bennett | |
| 5,884,256 A | 3/1999 | Bennett | |
| 5,940,800 A | 8/1999 | Bennett | |
| 5,943,393 A | 8/1999 | Howell | |
| 5,950,194 A | 9/1999 | Bennett | |
| 5,970,141 A | 10/1999 | Bennett | |
| 6,026,395 A | 2/2000 | Bennett | |
| 6,043,813 A | 3/2000 | Stickney | |

(Continued)

*Primary Examiner*—Stephen S Hong
*Assistant Examiner*—Gregory J Vaughn
(74) *Attorney, Agent, or Firm*—Stoneman Volk Patent Group; Martin L. Stoneman; Michael D. Volk, Jr.

(57) ABSTRACT

A system which is primarily of use for lawyers, judges and electronic court reporters operates to correlate personal log notes with digitally recorded audio proceedings, such as courtroom proceedings. The notes may be made in conjunction with the computer actually recording the courtroom proceedings; or they may be made on personal computers separate from the computer recording the court proceedings. Identification of the proceedings is made on both the digitally recorded proceedings, as well as on the log notes; so that they are correlated. Each time a note is entered, the time at which the note is entered is placed as a time stamp in conjunction with the note. When the log notes are synchronized with the recorded court proceedings (either at the time the proceedings begin, or at any subsequent time), reference subsequently to that note time stamp allows direct immediate access to the same running time on the court proceedings, for subsequent review of either the recorded audio or a transcription made of that audio carrying the same time references.

32 Claims, 8 Drawing Sheets

U.S. PATENT DOCUMENTS

| | | |
|---|---|---|
| 6,055,531 A | 4/2000 | Bennett |
| 6,173,259 B1 | 1/2001 | Bijl |
| 6,321,237 B1 | 11/2001 | Yamamoto |
| 6,389,434 B1 * | 5/2002 | Rivette et al. ............... 715/209 |
| 6,529,920 B1 * | 3/2003 | Arons et al. ................ 715/268 |
| 6,546,405 B2 * | 4/2003 | Gupta et al. ................ 715/233 |
| 6,571,211 B1 | 5/2003 | Dwyer |
| 6,721,703 B2 | 4/2004 | Jackson |

* cited by examiner

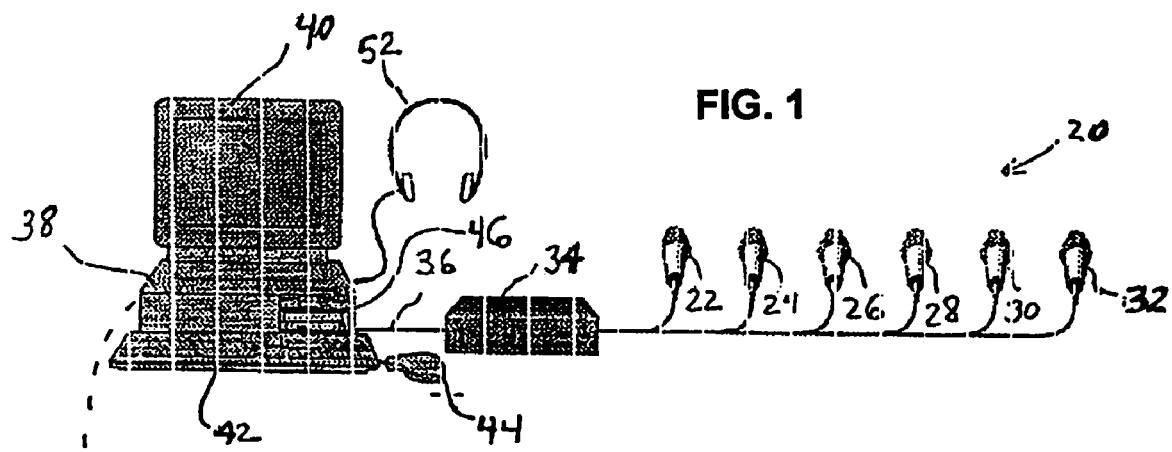
FIG. 1
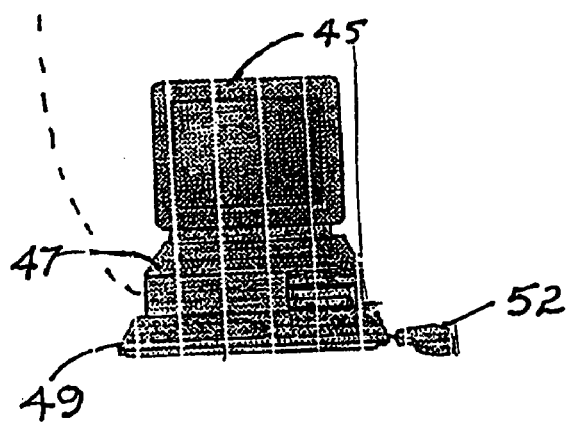
FIG. 2
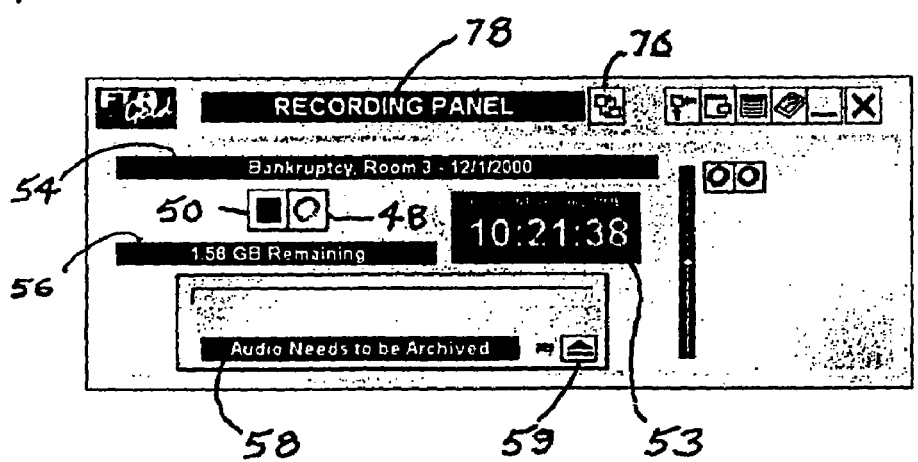

Each group of 5-min. audio files that contain the same location label and date are represented by one entry in the Open Audio dialog.

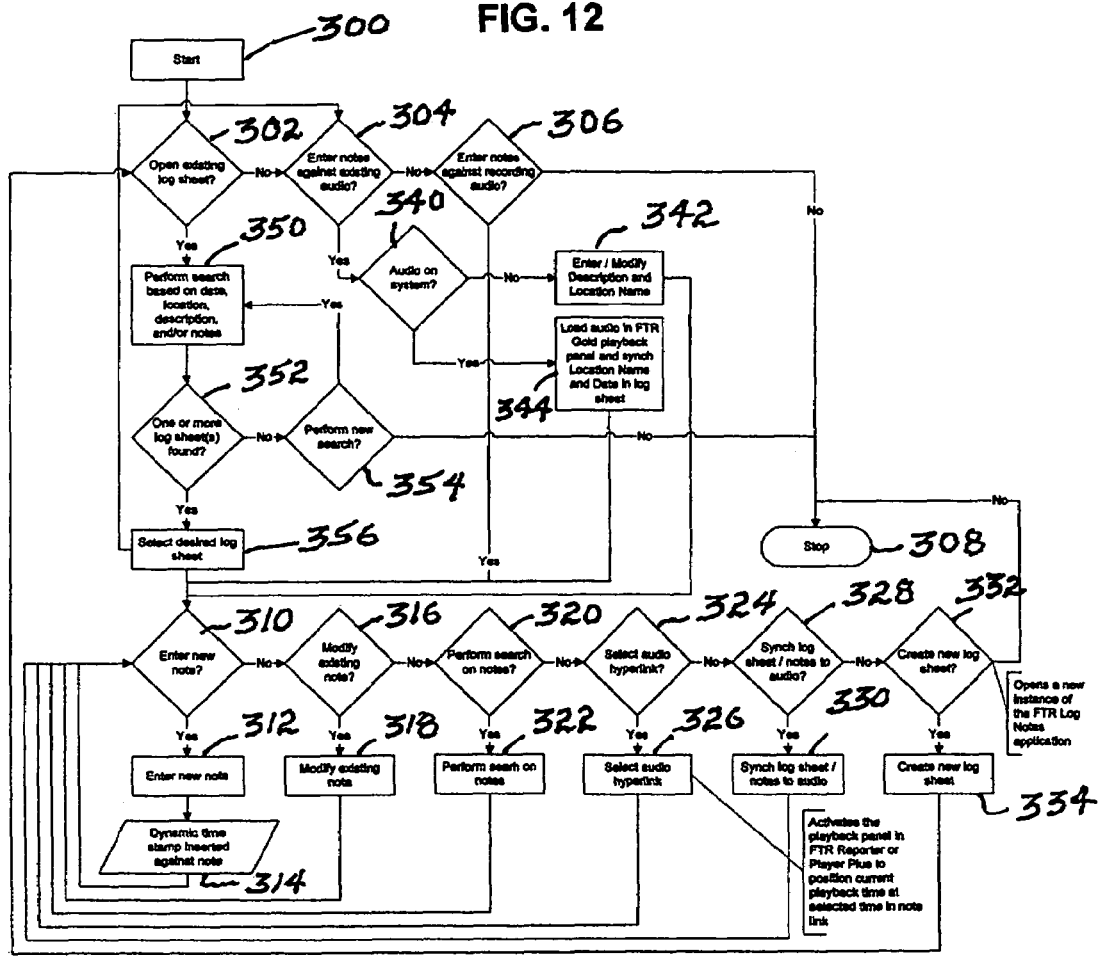

LOG NOTE SYSTEM FOR DIGITALLY RECORDED AUDIO

RELATED APPLICATION

This application is related to co-pending application Ser. No. 09/346,430, filed on Jul. 1, 1999 for a digital audio transcription system.

BACKGROUND

The present invention relates to a system for correlating log notes entered on a computer by persons during or subsequent to the recording of transcripts of proceedings. Specifically, the system correlates the notes to a recorded audio transcript to enable rapid and accurate access to specific portions of the transcript identified by the notes.

In conjunction with court proceedings and administrative hearings, it has been customary to provide a written transcript of the proceedings, with the help of a court reporter, for later review and reference. Basically, the proceedings are recorded on a stenographic writing machine, which is similar to a typewriter, but which is used for making a phonetic record of the spoken communications heard by the machine operator (court reporter) during the proceedings. Operators of such machines, such as court reporters, are trained and certified to capture a verbatim record of all testimony made during such court proceedings and administrative hearings.

During the actual hearing process, other persons present at the hearings, such as the judge and the lawyers for both sides, frequently make notes relevant to or corresponding to the testimony or other spoken conversation which takes place during the proceedings. In the past, it was necessary for the judge or the lawyers to correlate those notes with the subsequently produced transcript, requiring a relatively laborious manual search through the transcript to find the desired portions to which the notes were directed.

Recently, many courtrooms have switched to the production of an audio transcript recording of the proceedings. Judges or attorneys desiring a copy of the audio transcript are provided with copies of the recorded audio track, which then can be transcribed into a written transcript at a later date, if necessary. Originally, audio transcript recording systems relied upon magnetic tape as the recording medium. One or more microphones placed at strategic places in the courtroom picked up the voices of the judge, the attorneys and the witnesses. The microphones were connected through a mixer/pre-amplifier, which then fed a magnetic tape recorder for recording one or multiple audio tracks on the magnetic tape. Copies of the tape later were made by playing back the recorded tape and "dubbing" the audio tracks onto a new blank tape.

Various systems for accomplishing magnetic recording have been developed over the years. As with a written transcript of proceedings, however, any notes taken during the proceedings by the judge or the lawyers, for which a review of the actual recorded transcript was desired later, needed to be correlated by actually listening to a prepared reformatted magnetic tape recording of the transcript and then reversing or fast-forwarding to different sections until the desired section was found. Such correlation of notes with the transcript, again, was relatively time consuming and, particularly with respect to magnetic tape recordings, somewhat frustrating. This is true even though magnetic tape recording/playback equipment often includes a tape counter. Such tape counters are notoriously unreliable; so that even if a position were found through an initial correlation with a note, subsequent reliance on the counter to find that same position on a magnetic tape often resulted in a misalignment, which required further adjustment in order to hear the desired portion.

A computerized court reporting system for correlating the real time video/audio recording with the transcription made by the court is disclosed in the U.S. Pat. No. 4,924,387 to Jeppsen. In the system disclosed in the Jeppsen patent, a court reporting system provides simultaneous written and video record under the control of a single court reporter. The keystroke combinations made by the court reporter are recorded phonetically into a memory in the computer, which periodically obtains the current time and date from the system clock operating in conjunction with the video/audio recording to store these periodic time and date signals in conjunction with the keystrokes entered into the system. Thus, the subsequent written record, prepared from the stenographic keystrokes, includes time references which then can be used by persons present in the courtroom, or at some later date to correlate notes with the current time and date signals from the clock. The system, however, does not include a way for other persons to correlate notes with the record.

The U.S. Pat. Nos. 5,280,430 and 5,884,256 to Bennett are directed to a transcription network for use in a courtroom proceeding. The network has linked computer terminals for a court reporter, and for the various attorneys (and the judge) associated with the proceeding. A stenographic court reporter's terminal provides a speech-to-text conversion and communicates the text in real time through the network. This is accomplished through use of a computer aided transcription (CAT) system of the type which currently is in use in many courtrooms. CAT systems do not rely solely upon the paper tape for recording, but also electronically store the keystrokes in a built-in memory, or on a disk. In the system of the Bennett patents, the court reporter terminal provides speech-to-text conversion and communicates the text in real time through the network. Consequently, the text is displayed on the terminals at the different attorney locations, and at the judge, only slightly delayed from the actual speech being heard during the proceedings.

The different attorney interfaces in the Bennett system allow notes made by the attorney to be correlated to the currently displayed text, or to previously recorded text which can be viewed during the proceedings. The notes entered at each attorney's individual terminal are exclusive to that terminal (or to other terminals for attorneys associated with the first terminal). Notes from attorneys for one side, however, are not available to attorneys for the other side, unless specific procedural implementations agreed to by both sides are effected, when specific communication by way of the terminals is desired. In order for this system to work, however, it is necessary that all of the terminals are linked to the stenographic court reporter's terminal as the proceedings take place. The system does provide for marking of specific portions of the record, which is recorded in each computer terminal at times outside of the deposition or court proceedings, by scrolling through the record and marking or making notes appropriate to various questions and answers, as desired. Since the record is stored in the computer terminal, the marking is directly associated with the record; so that correlation with the marking and a record recorded elsewhere is not required.

Another feature of the Bennett patents is to allow the court reporter and attorneys to correlate the translated proceedings to the actual video/audio recording of those same proceedings. The correlation is effected by means of a synchronization scheme, which electronically associates each stenographically recorded question and answer with the actual position on the audio tape. The tape recorder is attached by a communication link to the reporter terminal. When an entire question and answer has been received, the reporter terminal requests and receives a position indication from the tape recorder counter. The marker position is generated by the tape recorder by a tape length counter and its associated circuitry. The reporter terminal then stores and associates each such position indication with the corresponding keystrokes. Afterwards, whenever necessary, the court reporter or attorneys can display the position indicator and locate the desired audio manually. The previously mentioned problems with locating audio on a tape by means of a position indicator continue to exist with this system; although an effort has been made to correlate the written record with the spoken record, simultaneously.

The U.S. Pat. No. 5,280,430 to Woods is directed to a computer aided transcription system which provides individualized electronic marking of stenographic records during the court proceeding. The system of this patent is directed to a stenographic transcriber functioning in conjunction with a CAT system. The court reporter keyboard is linked with the computer and the system also is directly linked to individual terminals for each of the attorneys and other persons, such as the judge, who may desire to mark the subsequently produced transcription record for personal follow up at a later time. The CAT system, operates in conjunction with the court reporter in a conventional manner. Simultaneously, however, whenever any one of the other independent terminals is operated, a reference signal is supplied to the CAT terminal corresponding to the operation of the mark or "flag" produced by the individual operating that terminal. Each of the individual terminals are separately encoded; so that when the written record subsequently is produced, it may be produced without any of the additional references; or individual copies carrying only the references for the particular terminal producing those references is produced. Thus, if there are four different attorney terminals linked to the system during the proceedings, a printed record provided to each of the attorneys uniquely carries his or her marks adjacent the transcript or text; and the marks of the other attorneys do not appear on that copy. Each individualized copy therefore is different from the others. The purpose of this system is to allow attorneys to reference a particular portion of the printed transcript without relying entirely upon hand written notes taken during the proceedings. Hand written notes taken during the proceedings using the Woods system may be subsequently manually correlated with the marks, which are reproduced in the transcription text, alongside that text. Searching for a particular portion of a record employing this technique is an improvement over notes taken without any correlation with the stenographic record. It still is necessary, however, to page through the record to find each of the sequential or corresponding marks for subsequent follow up. The actual text of the note is not displayed alongside the text, but necessarily is a part of some separate record, either in the form of separate note slips or a compilation of a number of individual notes made at some later date.

The system described in the above identified application is an improvement over the various prior art systems described above. In the system of co-pending application Ser. No. 09/346,430, a computer based audio digital transcription system is used to record and copy transcripts of court proceedings and administrative hearings. In the system of this application, the proceedings are specifically identified by a name or location, the date, and a running digitally recorded time corresponding to the various portions of the digital record. The time is continuously displayed, and, in a preferred mode, the clock display in the courtroom is the actual time recorded in conjunction with each segment of the digitally recorded audio proceedings. Consequently, any notes which are made by any of the attorneys, judges or other parties during the proceedings can be immediately correlated in the hand written note with the displayed time. Subsequently, when the recording is played back in the system disclosed in this co-pending application, the specific time may be entered; and the system immediately returns to that moment in the recording for review, as desired. Consequently, by entering the time when the event took place during the actual court proceeding, review instantly can be made without the long rewind or fast-forward procedure required with magnetic tape systems. Since an inaccurate length counter is not utilized, but a pre-recorded time reference to an actual time instead is used, the access to the desired testimony is accurate and immediate. Similarly, when the recorded testimony is transcribed into text form, a time stamp also can be inserted, if desired, alongside the text. Consequently, subsequent reference to a particular portion of transcript text to be made in conjunction with a note made during the proceeding can be rapidly effected by looking at the time written on the note to correlate with that same running time as it is displayed on the margin of the printed text. To access specific audio information, it only is necessary to enter the time of interest in conjunction with the playback of that particular audio record.

It is desirable to provide a system for correlating notes regarding proceedings captured by an audio digital recording system directly to the recorded audio for review purposes, whether the notes are taken during or after the recording of the proceedings.

SUMMARY OF THE INVENTION

Accordingly, it is an object of this invention to provide an improved system for correlating notes taken during an audio recording session with specific recorded audio segments.

It is another object of this invention to provide an improved system for correlating notes taken during an audio recording with specific segments of the audio recording for accessing such segments from the notes.

It is still another object of this invention to provide an improved log note system which may be operated on computers apart from an audio recording system for facilitating instant access to specific segments of the transcription by indexing the transcription in conjunction with the log notes.

It is a further object of this invention to provide an improved system for creating and entering log notes correlated to a digitized audio transcription system to facilitate indexing quickly and easily to segments of the recorded transcription corresponding to individual log notes.

In accordance with a preferred embodiment of the invention, a system creates and enters log notes correlated to a recorded transcription. The system includes a computer having memory for storing digital signals corresponding to specific individual log notes to be recorded. The computer associates at least a time with each note. The computer may or may not be associated with the system which is effecting the recording of a proceeding. A display may be coupled to the computer allowing the computer to display file entries for log notes associated with unique recorded transcription file entries. The log notes are correlated with the corresponding recorded transcription information; and the system is responsive to a-selected log note for automatically-locating that portion of a recorded transcription corresponding to the selected log note.

BRIEF DESCRIPTION OF THE DRAWINGS

FIG. 1 is a schematic diagram of a digital audio transcription system and a log note creating system in accordance with a preferred embodiment of the invention;

FIG. 2 is an image of a recording panel as displayed on the personal computer monitor during recording operations of a digitally recorded audio transcript;

FIG. 12 is a flow diagram illustrating the operation of the System in accordance with a preferred embodiment of the invention.

DETAILED DESCRIPTION

Figure 3:
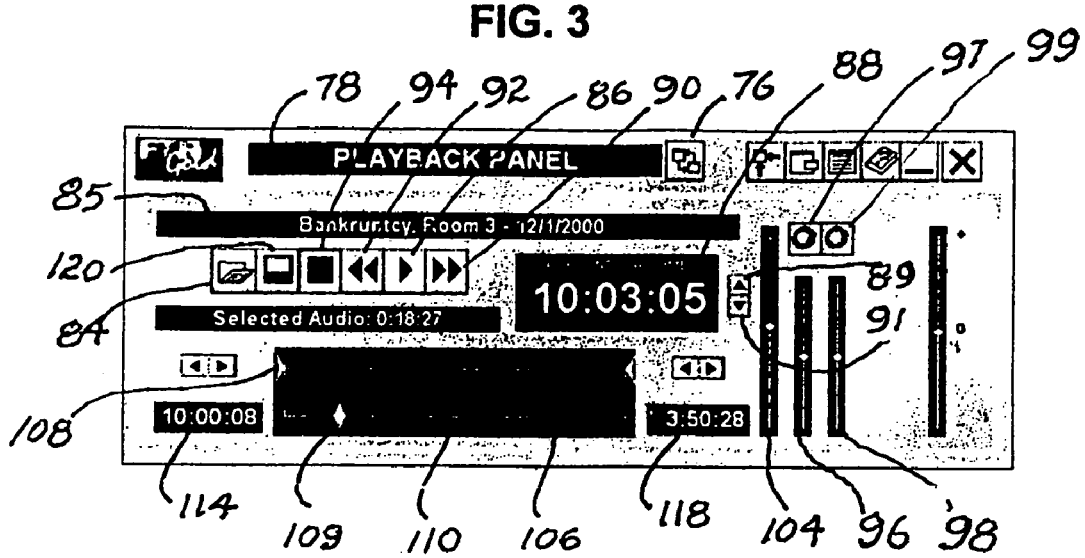
FIG. 3 is an image of a play-back panel as displayed on the personal computer monitor after a stored digital audio file has been loaded for play-back.

Reference now should be made to the drawings, in which the same reference numbers are used throughout the different figures to designate the same or similar components. This application is primarily designed to operate with the digital audio transcription system of the above identified application Ser. No. 09/346,430 filed Jul. 1, 1999, the specification of which is incorporated herein by reference, in its entirety. The log notes system which is described herein also is capable of operation with systems other than the one disclosed in the specification of the application incorporated herein by reference; but the primary utility of the log note system is in conjunction with such application.

Even though the co-pending application Ser. No. 09/346,430 is incorporated herein by reference, a brief overview of the system disclosed in that application, and its operation, is given here to establish the operating environment of a preferred embodiment of the present invention.

As shown in FIG. 1, a digital audio transcription system of the type disclosed in the referenced co-pending application, for use in a courtroom or elsewhere, is shown schematically and is designated generally by reference numeral 20. In conjunction with the description of the preferred embodiment of this invention, and in conjunction with the system disclosed in the referenced co-pending application, it is assumed that the system is used within a courtroom. It is understood that such a system may be used in other environments as well.

As shown in FIG. 1, a series of microphones 22, 24, 26, 28, and 32 are positioned about the courtroom (that is, at the judge's bench, near the witness stand, near the counsel tables, near the jury box, etc). Each of the microphones serves as a source of audio signals to be recorded. Typically, the number of microphones exceeds the number of channels being recorded. Thus, each of the microphones is coupled by an audio cable to an audio mixer 34 to allow the volume level/sensitivity of each microphone to be adjusted, and to mix two or more of the incoming audio sources into a single channel or track. The system for accomplishing this is described in greater detail in the above referenced co-pending application.

The output of the mixer 34 is supplied through a cable 36 to a card 46 in a personal computer 38, which includes a display monitor 40, a keyboard 42, and a mouse 44, or like pointing device. The computer 38 is used to provide a permanent digital recording in the manner disclosed in co-pending application Ser. No. 09/346,430. The computer 38 includes a sound card with one or more analog-to-digital circuits to convert the audio signals to digital signals, which then are stored, initially on the computer hard drive. The stored digital signals also then later can be played back or stored in a more permanent form of storage.

In many court proceedings, the individual attorneys also have personal computers or laptop computers present with them during the proceedings. Such a computer 47 is also shown in FIG. 1; and it includes a monitor 45, keyboard 49 and a mouse 52, or comparable pointing device of standard configuration. Either the computer 38 or the stand-alone computer 47, or both of them, with their associated components, may be loaded with the software for the log notes of a preferred embodiment of the present invention. The manner in which the log notes system operates on these computers is identical in conjunction with both computers; and it does not matter whether it is used on the stand-alone computer 47 or the computer 38 on which the digitally recorded audio is being effected.

In order to understand the manner in which the log notes are correlated and operate in conjunction with the digitally recorded audio transcription, a brief review of the recording panel and the playback panel of the digitally recorded audio proceedings is provided in conjunction with FIGS. 2 and 3, respectively. For a detailed review of the recording and playback operation, which is illustrated in FIGS. 2 and 3, reference again should be made to the above mentioned co-pending application. As described in that application, when the software for the digital recording system is powered up, a recording panel similar to that shown in FIG. 2 is displayed on the display screen 40, except that the displayed "current record time" is blank. Before starting a recording session the operator preferably activates an archive feature of the system. When the panel first is displayed, the need for such archiving is displayed at 58, as shown on FIG. 2.

To enable the archiving of the information to be recorded, the operator moves the mouse cursor over the button 59 of the media drive. Otherwise, archiving can be disabled by toggling off the button 59. By enabling archiving during recording, digital audio signals are copied to a permanent storage media quickly and automatically throughout the proceeding (which can be throughout the day). The manner in which such archiving is effected is described in detail in the co-pending application, incorporated by reference.

As with older audio tape recorder systems, the user "presses" (that is, places the mouse cursor over and left clicks) the prominent, circular "START RECORDING" button 48 on the recording panel shown in FIG. 2, much like pressing the "record" button on a conventional audio tape recorder. When a recording is to be stopped, the operator "presses" the "STOP RECORDING" button 50. During the court proceedings, the system is ready to "go on the record" by simply "pressing" the "START RECORDING" button 48 once more. Whenever the proceedings go "off record", the "STOP" button 50 is pressed for the duration of the "off the record" time period.

Once the court is on record, the operator can listen to or monitor to all of the proceedings using the headphones 52, which are connected to the personal computer 38. As explained in the aforementioned co-pending application, this function is known as "confidence monitoring". During each recording session, the START RECORDING button 48 is lighted or brightens, and a large "CURRENT RECORD TIME" clock 53 is displayed on the recording panel. This indicates to the operator that the system is recording; and the time displayed by the "CURRENT RECORD TIME" clock 53 is the real clock time of the recording session at any particular moment. In other words, if the current time is 3:45 PM and 22 seconds, the "CURRENT RECORD TIME" display clock 53 displays "3:45:22". This is the official clock in the courtroom or administrative proceedings. Optionally, a large external clock display (not shown) can be connected to an available serial COM port on the computer 38; and this can be placed on the judge's bench, or in any other desired location. If there is a system failure which might stop the recording from taking place, the failure is noticed immediately because the clock 53 also stops instantly.

In addition to the current record time clock 53, the recording panel shown in FIG. 2 constantly displays other relevant information. For example, the name of the courtroom where the recording is taking place is entered by the operator and is displayed on the panel 54. A remaining time panel 56, or a remaining memory space indication is displayed just under the start and stop buttons 48 and 50, allowing the operator to see how much space or time remains available on the hard drive of the computer 38 for recording additional audio information. This information at the panel 56 can be displayed in recording time remaining, megabytes remaining (as shown in FIG. 2), percentage of disk space used, or as a simple progress bar showing the amount of disk space used.

As mentioned, the operator can go on and off the record as frequently as needed by simply "pressing" the stop button 50 to go off the record, and by pressing the "start" button 48 to go back on the record. The buttons 48 and 50 of the recording panel also serve as a means for signaling the personal computer 38 to start recording of the digital signals, and for signaling the computer 38 to stop recording the digital signals, respectively, in order to define a recording session. Archiving of audio which had not already been copied to the permanent (archive) storage media immediately is copied whenever the archive function is turned on. The operator then can remove the archive media and store it for later retrieval, as needed.

As mentioned in the above identified co-pending application, there is no necessity for the operator to be concerned about saving files or naming files because the file creation and file naming are handled automatically by the software. As is readily apparent from the disclosure of the co-pending application, the file names of the audio files created reflect where (or what) and when they were produced, which is sufficient information to make them unique. This information also allows the content to be deduced from the file names themselves. It is important to note that because of the file naming strategy which is used, no database, proprietary or otherwise, is required to manage the audio as is the case with other digital court recording systems. Other specific operating features of the system during recording are explained in greater detail in the referenced co-pending application.

Once the audio has been recorded and exists in the recorded audio files, these files may be loaded and played back utilizing the software and system of the referenced co-pending application. Whenever an operator desires to play back a portion of the recorded digital transcript, either on the computer 38, during or after the recording session, or when a recording is inserted into a separate computer, such as the computer 47, for playback, the operator places the mouse cursor over the panel change button 76 and clicks the mouse button to signal that playback is desired. In this event, the monitor 40 or 45 of the personal computer 38 or 47 does not display the recording panel shown in FIG. 2. Instead, the monitor of the computer 38 or 47 displays the playback panel shown in FIG. 3. Thus, the monitor 40 or 45 displays a first screen appearance (the recording panel) for controlling recording operations and displays a second screen appearance (the playback panel of FIG. 3) for controlling playback operations. The appearance of the playback panel of FIG. 3 is uniquely different from the appearance of the recording panel of FIG. 2; so that the operator is not confused about which mode has been selected. The panel change button 76 serves a means for toggling the display between the recording panel and the playback panel on the screen 40 of the computer 38 being utilized for the recording session. As is apparent from an examination of both FIGS. 2 and 3, the playback panel, like the recording panel, also includes a panel label 78; but this label now displays the words "PLAYBACK PANEL", rather than "RECORDING PANEL".

Figure 4:
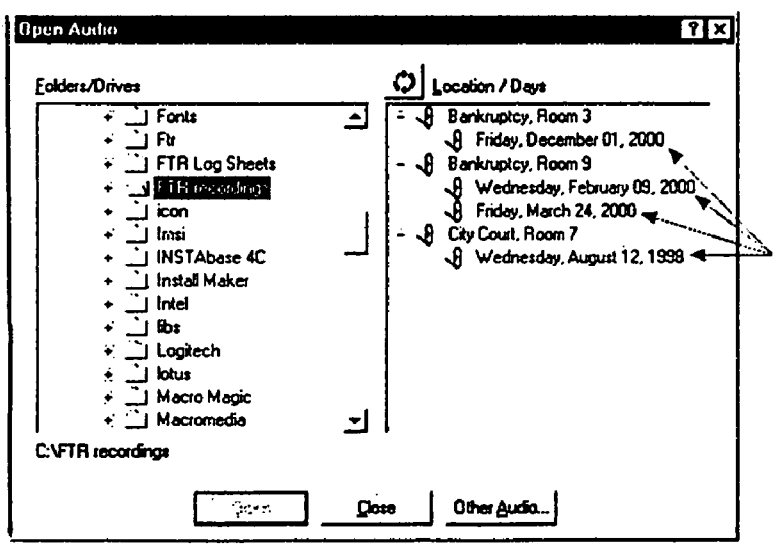
FIG. 4 is an image of a panel as displayed on the personal computer monitor used to locate a digital audio file.

In order to access a recording for playback, a user must first select a virtual file that contains the desired digital audio transcript. The audio is selected based on the location label and date. As noted in the aforementioned co-pending application, all of the five minute files which meet the criteria of one location and one particular file are loaded under this same location label and date. To select a file, the user presses the "OPEN FILE" button 84 on the playback panel in conjunction with a mouse cursor. This action causes the monitor 40 or 45 of the affiliated computer to temporarily display a file listing or groupings of audio, as generally shown in FIG. 4. Instead of displaying all of the file segments created and stored on the hard drive, the file listing shown in FIG. 4 displays virtual files, each of which may be made up of tens or hundreds of actual recorded file segments, each having a five minute length. Each such virtual file includes the date corresponding to the date on which such proceeding was recorded, as indicated in FIG. 4, and in addition, virtual files are grouped by location, such as "Bankruptcy Room 3", or "City Court room 7", as indicated in FIG. 4. The user then browses the particular drive and directory containing the subject audio. As noted in conjunction with FIG. 4, the selection dialogue lists the audio contained in the directory by the location labels and dates. It should be noted that when an entry in the list is selected for loading in a conventional manner associated with the MICROSOFT WINDOWS® operating system, all of the five minutes files in the group are loaded into the playback panel, with each file in chronological order. The fact that the recorded digital audio exists in multiple five minute files is transparent to the user. The user is only aware that he or she has loaded all of the audio from a particular location and day, as identified in accordance with the directory selected from the list in FIG. 4.

Similar to the recording panel shown in FIG. 2, the playback panel of FIG. 3 includes a display 85, which displays the location and date of the recording selected by the user. The playback panel includes the standard "buttons" that ordinarily are found on an audio tape courtroom recording system, including a "PLAY" button, 86, a "FAST FORWARD" button 90, a "REWIND" button 92, and a "STOP" button 94. To listen to the selected recording, the user simply presses the PLAY button 86 on the playback panel. Unless the user otherwise specifies, playback will start with the earliest file segments, that is, the first recording segment at the beginning of that recording session of the specified date.

As shown in FIG. 3, the playback panel also includes a current time display 88, which displays the time at which the recorded digital audio currently being played back was originally recorded. This clock or time display is not the current clock in the location where the audio is being played. It is the clock of the time at which the audio was recorded; and the clock displayed in panel 88 continuously changes, second by second, as the audio progresses. As audio at different portions is selected, the clock immediately reflects the recording time of the particular session which is being played.

A pair of buttons 89 and 91 can be "pressed" with the mouse cursor rapidly to increment or decrement the current play time to a desired value. Alternatively, the user can simply place the mouse cursor over the hours, minutes or seconds portion of the current playtime window 88, then left click the mouse and thereby highlight a portion of the current playtime. The user then may type desired values for the current (recorded) playtime on the keyboard 42 or 49 of the computer in which the playback is being effected to cause playback to proceed immediately to such portion of the recorded audio. The clock will reflect the changing time from the playback at that selected portion, as playback continues.

The playback panel shown in FIG. 3 also includes slider controls 96 and 98, which may be manipulated by placing the mouse cursor on one of the slider controls and holding the left click mouse button down to "drag" the slider controls up or down in a conventional manner to increase or decrease the volume of the different channels of the recording only two recording channels are shown in the playback panel of FIG. 3. Additional channels, typically up to four, may be utilized; and similar controls for controlling the volume of those channels also may be implemented. The user also can isolate one or more channels from the others by turning off certain channels to focus on a particular speaker, or to cut out extraneous noise. The channels can be enabled or disabled by toggling the CHANNEL ENABLE buttons 97 or 99. Preferably, these buttons will appear green if the corresponding channel is enabled and red if the channel has been disabled. Finally, a master volume control slider 104 may be manipulated in the same fashion as the controls 96 and 98 to increase or decrease, simultaneously, the volume of both channels.

The playback panel of FIG. 3 also includes a graphical 2 display window 106, which displays an upper time line 108 and a lower time line 110. The upper time line 108 graphically displays an entire day's recording for the selected virtual file. In FIG. 3, tick marks are displayed within the upper time line 108; and these marks indicate discontinuity in the recorded record, such as when the recording was stopped and then later restarted. The lower time line 110, or audio slider bar, serves as a "zoom" feature to enlarge that portion of the upper time line 108 that falls within a selected range. A marker 109 superimposed upon the lower time line 110 indicates the current playtime within the selected range. A user quickly can adjust the current playtime by "grabbing" the marker 109 with the mouse cursor, as described above, and "dragging" the marker 109 back and forth until the desired playtime is displayed in the current playtime window 88. Other specific features for operating the playback of a recording under the control of the different buttons and sliders, shown in FIG. 3 and described above, are explained in greater detail in the aforementioned co-pending application.

In accordance with a preferred embodiment of the invention, in order to enable judges, attorneys or other parties to make notes during the initial recording of the proceedings, or subsequently during playback of previously recorded proceedings, the log note system and software disclosed hereinafter is implemented. Notes may be logged in the log note system by the person performing the audio recording of the proceedings during that recording in conjunction with the recording equipment described in conjunction with FIG. 1 to generate notes which highlight the audio for navigational and clarification purposes. Such persons are generally referred to as electronic court reporters (ECR). For example, in the case of court proceedings, the ECR might make note as to when a specific witness takes the stand, including a correct spelling of that witness' name. The resulting log note then is useful later to transcriptionists performing transcription of the recorded proceedings. Similarly, the log notes system and software described hereinafter is useful to other parties, in that they can take private notes during or after the recording of proceedings for review purposes.

Figure 5:
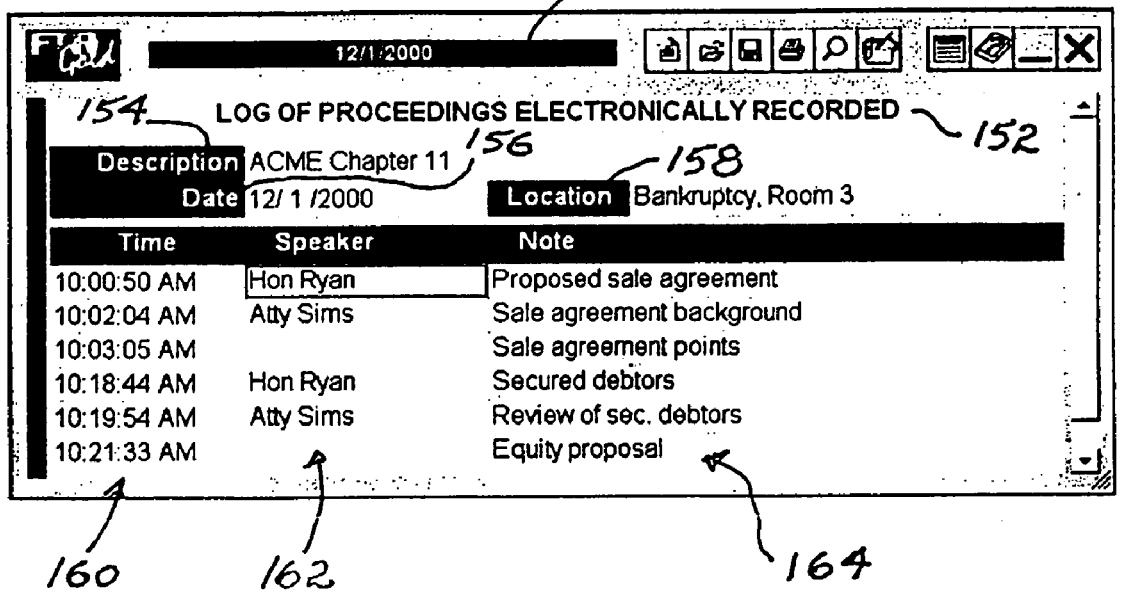
FIG. 5 is an image of a log note panel as displayed on the personal computer monitor of the log notes of proceedings corresponding to a digital audio file.

FIG. 5 depicts the log note application interface as it is displayed on the computer screen 40 or 45 to a person utilizing the log note application. As is the case with the recording and playback panels, the log note panel also includes a heading 152 clearly identifying it as "LOG OF PROCEEDINGS ELECTRONICALLY RECORDED". There is a date-display 150 which constitutes the date of the creation of the log note itself. In addition, there is a date field 156, which is the identity of the date of the recording which is being played back. There also is a location field 158 which carries the identity of the file name corresponding to the file name of the recording. The manner in which the two fields 156 and 158 are completed is described subsequently. An optional description field 154 is provided, where the user can add his or her specific text identifying what the contents of the log sheet are all about. This field 154 is unique to the log sheet and is not a part of the file identification on the recorded proceedings. That identification is given in the two fields 156 and 158.

Finally, the log notes themselves are divided into three different fields 160, 162 and 164, respectively, identified as "TIME", "SPEAKER", and "NOTE", in the preferred embodiment illustrated in FIG. 5.

The log notes are a stand alone WINDOWS® application; although one of the primary features of the log notes, the representative panel of which is shown in FIG. 5, is that it can dynamically link to the digital audio loaded in either a recorder or player utilizing the system and software of the referenced co-pending application. Use of the log notes, however, is not dependent upon either of these specific recording or playback applications being installed on the user's system, since notes can be made on a stand-alone basis, providing the information generally indicated in FIG. 5 for subsequent use with other systems. A feature of the log notes system, however, when it is used in conjunction with the system of the co-pending application is that automatic correlation and interaction between the log notes and playback of recorded sessions, using the referenced co-pending system, facilitate the playback operation and correlation of that operation with specific log notes.

It should be noted that multiple instances of the log notes application may be running or open on a given user's system at any one time, but that only one log sheet is active for operation at a time. A log sheet is a single file which contains one or more log notes associated with audio from a specific location and day. Multiple log sheets can be created that are associated with the same audio; but each of the log sheets are independent of one another. To explain the various features and functions of the log notes system, the operation best is presented through particular use scenarios, as depicted in FIGS. 6 through 11, taken in conjunction with the flow chart of FIG. 12. These scenarios are presented under different headings below.

Creating a Log Sheet and Notes for Audio Currently Being Recorded on the Same System A common scenario for creating a log sheet is when the user who is performing the audio recording, such as the ECR, is taking associated notes regarding the recorded proceedings. This is the situation where the ECR is recording courtroom proceedings, and also must take log notes of the proceedings for later use by the transcribers during the transcription process. For example, an ECR may take notes which clarify what is happening within the proceedings, such as when a witness is called, with notes bearing identifying information. Other notes may be taken when exhibits are introduced, identifying which participant is currently speaking, etc.

Figure 6:
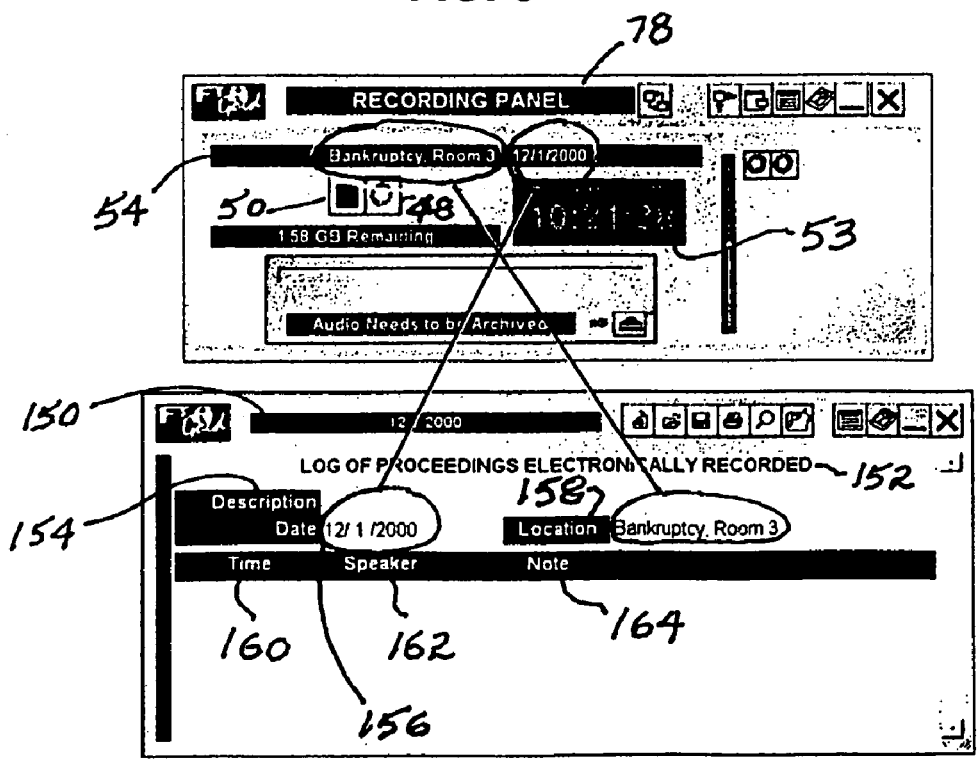
FIG. 6 is an image of a log note panel correlated with the recording panel of FIG. 2 for a log sheet used in conjunction with audio currently being recorded on the same system.

For a log sheet and notes for an audio currently being recorded, the user first initiates the recording session, as described above in conjunction with FIGS. 1 and 2. The recording panel of FIG. 2 is displayed when the proceedings begin. This is indicated in the top one of the two panels displayed in FIG. 6. At the same time, the ECR or other person operating the recording 2 session opens a log notes window, such as the lower window shown in FIG. 6. A new blank log sheet is displayed; and the log notes application automatically queries the recording application for the location label (that is, the recording system descriptor used in the audio file names to identify the audio) to add to the log sheet. This transfers the descriptor location shown in panel 54 of the recording panel to the date and location panels 156 and 158 of the "log sheet" panel, as indicated in FIG. 6. This operation also places the current date into the log sheet, in the panel 150. As mentioned previously, the user also may enter additional information in the description panel 154, such as the information which is indicated in the log sheet panel 154 of FIG. 5.

At this point, and once the recording has begun, the user may enter new log notes into the log sheet. As described previously in conjunction with FIG. 5, each log note is made up of three fields including the time field 160, the speaker field 162, and a note field 164. Until the user enters any text either into the speaker field 162 or note field 164, the log note remains blank, as shown in the lower portion of FIG. 6. As soon as a note is entered into either of these fields, however, a time stamp immediately and automatically is inserted in the time field of the particular note, such as indicated in the various notes shown in FIG. 5. The time entered reflects the system time of the computer 38, which also matches the recording time 53 of the audio on the recording panel (FIG. 2), since the same computer which is recording the audio is being used for the log note in this example.

FIG. 12 indicates the steps which are undertaken to effect this initiation of a new log note associated with the audio being recorded. The log note is displayed by starting the operation at 300. A decision next needs to be made at 302, as to whether or not to open an existing log sheet. Since, under this present example, a new log sheet is to be created, the answer is "no"; and the next decision is whether to enter notes against existing audio at 304. Again, since this is an ongoing new recording, the answer is "no". The next decision then is whether the notes are to be entered against a recording audio at 306. If the answer is "no", the system stops at 308.

In the present example, however, notes are to be entered against current audio recording; so that the next step is at the decision diamond 310, as to whether to enter a new note. In conjunction with the normal operation of the system, the answer is "yes"; so that new notes are entered at 312. This automatically initiates the dynamic time stamp inserted against the note at 314 on a continuous basis as each new note is entered. This occurs each time an entry is made, in either the speaker or the note fields 162 or 164, to produce the correlated time stamps in the field 160 which are identical to the time of the recording displayed in the window 53 as the proceedings progress.

Figure 7:
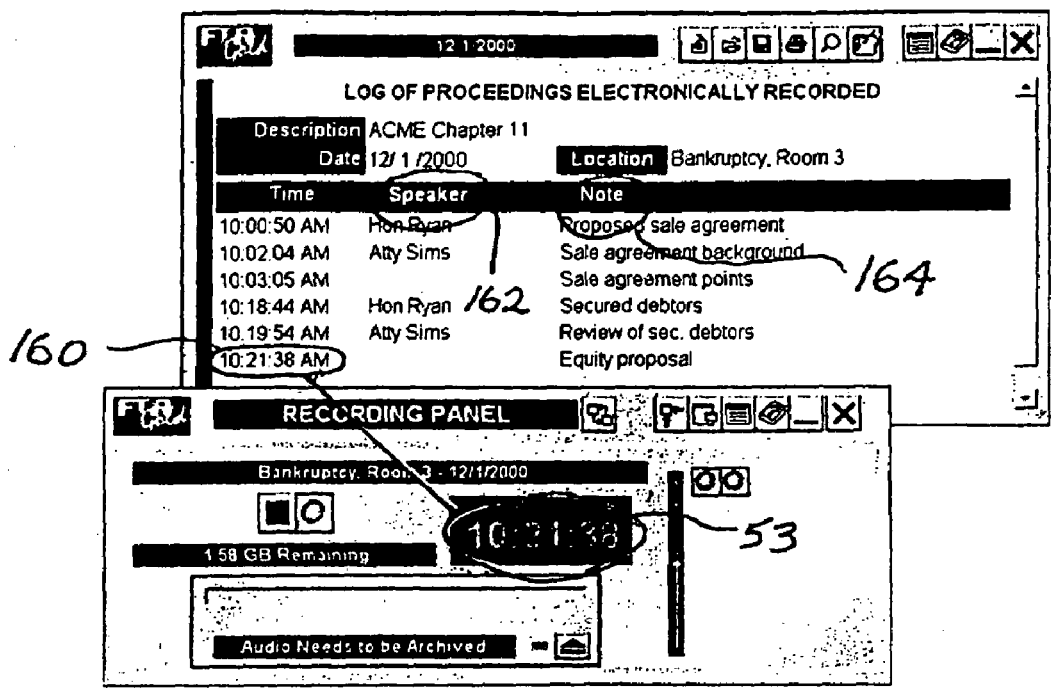
FIG. 7 is an image of a recording panel and a log note panel illustrating correlation between a digital audio recording and the log notes.

Consequently, the notes which are taken during recording by the ECR are accurately correlated by time in the field 160, with the time at which the entry was made in either of the other two fields 162 or 164. This is indicated in FIG. 7, which shows a display of the recording panel and the time at 53 which corresponds with the last (current) entry at the bottom of the log notes shown at the top portion of FIG. 7. All of the other entries which are shown in the note of FIG. 7 also were automatically provided with the corresponding recording time, as those notes were entered, since the notes are being entered on the same computer which is effecting the original recording of the information.

Figure 8:
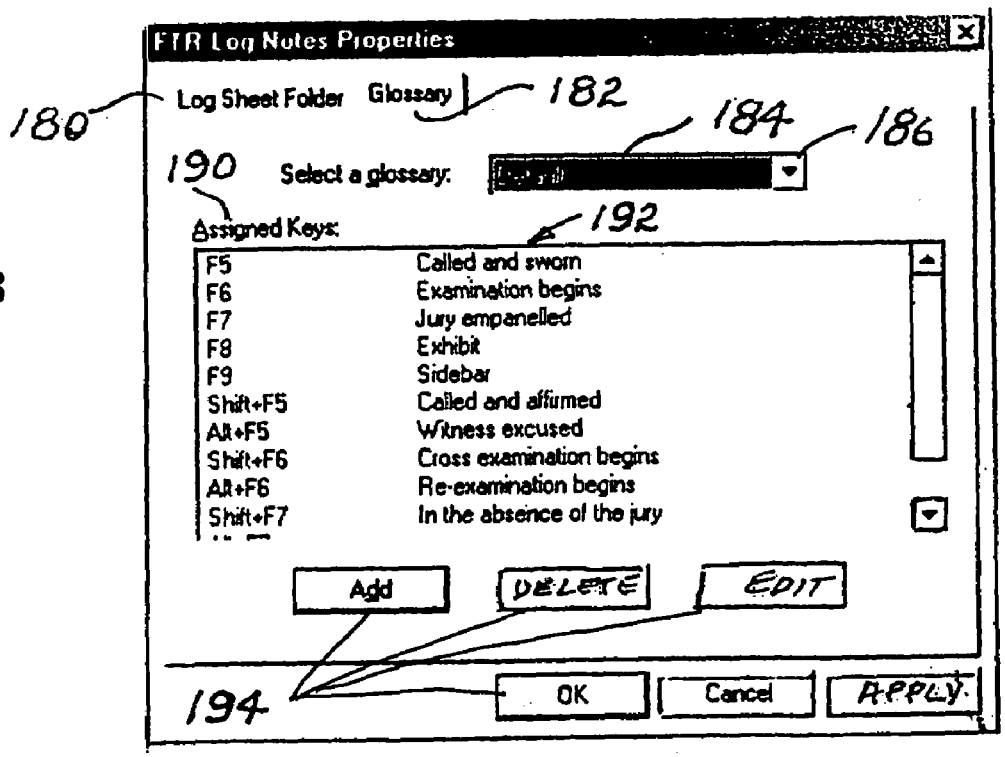
FIG. 8 is an image of a computer panel illustrating the use of user-defined glossaries.
Figure 9:
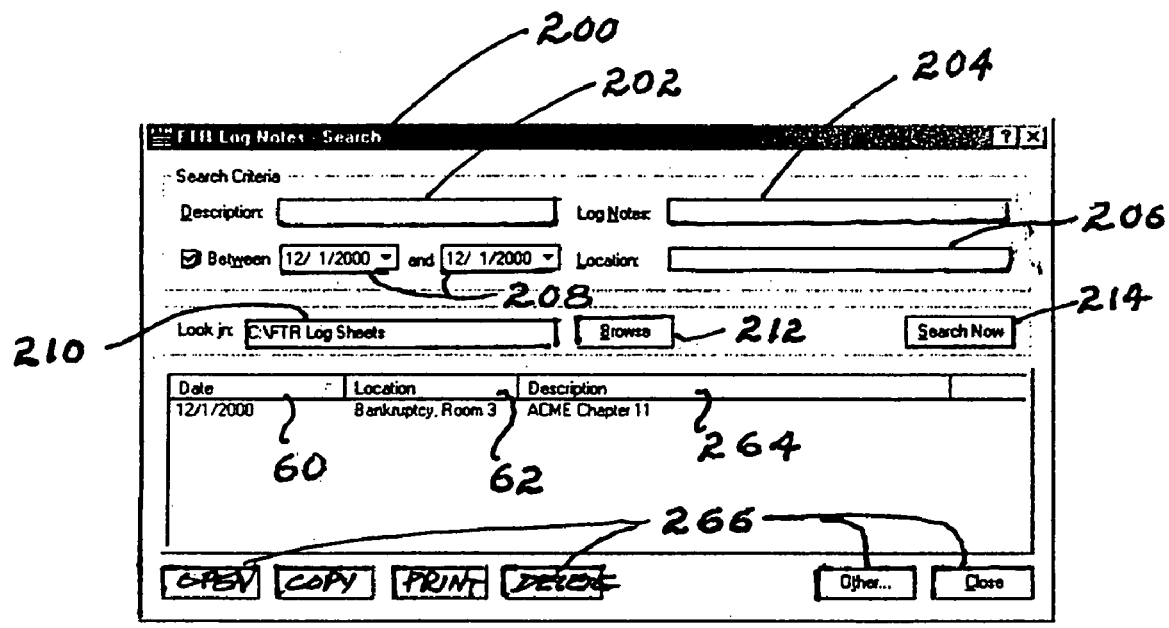
FIG. 9 is an image of a log note panel as displayed on the personal computer monitor for a log sheet search interface.

Reference now should be made to FIG. 8, which illustrates, by way of example, one of various user glossaries which may be utilized for both the speaker field 162 or the note field 164 to facilitate the entry of various notes. For example, user defined glossaries may be developed by the user in advance of the actual implementation of operation of the notes, where the user can assign a collection of definable "quick keys" to strings of text to increase the efficiencies of repetitive text entries. FIG. 8 is merely illustrative of an example of such a glossary, which may be utilized in conjunction with the note field, for example.

When the glossary of the program is displayed on the computer screen 40 (in the present example), or 45 in conjunction with a subsequent playback or a creation of a log note apart from the recording computer 38, the display shows that it is for a log sheet folder 180 and a glossary 182. A window 184 displays glossaries for selection; and a selection "button" 186 may be used to display the various glossaries to be selected. This can be for identification of speakers, or for text strings to be entered into the note field 164. As displayed in FIG. 8, the glossary selected is for the text field 164. Keys which can be assigned are displayed at 190; and the text to be entered for automatic entry upon selection of the assigned keys is typed opposite those key designations at 192 in the display. For example, function key F-7 of the example in FIG. 8 is used to insert the words "JURY IMPANELED" into the log note text when that assigned key is pressed for that note, at the particular time this event takes place. Various other designations are readily apparent from FIG. 8; and the operation of the particular keys or key combinations which are shown provide the desired note automatically, without typing in all of the letters for that note. The different function keys 194 are used to effect various operations on the glossary; so that information can be added, deleted, edited, etc. at any time, at the desire of the user.

Similar glossaries may be used for entering the names of witnesses and attorneys, or other person who are expected to provide spoken dialogue during the proceedings; so that as these persons speak, the log note identifies the speaker. This can be done simply by pressing the assigned key, without having to type in the name each time it occurs. Thus, the speaker identification which is shown in Field 162 of both FIGS. 5 and 7 may be entered as a "QUICK KEY" operation. By using the designated keys in conjunction with glossaries for the different fields, the user can save many keystrokes when entering strings of text that need to be entered multiple times in the log notes. It also should be noted that multiple glossaries may be created on the same system for different users, different types of proceedings, etc.

The log sheets are automatically saved to the disk of the computer 38 or 47. A new log sheet, however, is not saved for the first time until the first note is actually entered. If no note is entered, no log sheet is saved, since basically, no log sheet actually was created. When the log sheet is completed, the user simply can close the log sheet for retrieval at a later time from the disk, and can also save the log sheet to another location, if desired.

Creating a Log Sheet and Notes for Audio Currently Being Recorded on a Different System The system function and operation here is one where the log sheet and the notes are created on the computer 47, for example, which is separate from and not physically or electronically connected with the computer 38 on which the sound recording is being made. An example of a situation utilizing this type of operation is one in which in which a judge or an attorney taking notes during a court proceeding does so on his or her notebook computer in the courtroom. Because the recording is not being performed on the same system as the log notes, the location label set on the recording system as described in conjunction with FIG. 6 is not available for automatic insertion into the new log sheet. This, however, is not a problem, since the location label manually can be entered at any time; or it can be added automatically when the audio record becomes available later for review. This is discussed subsequently in the portion for associating log sheets with audio.

The various other functions for this scenario are performed in the same manner as described above in the situation where the log notes are being entered on the same computer on which the recording is being made. There are some additional caveats, however. The date that is inserted into the log sheet field 156 is the system date of the local computer. Ordinarily, this date should match the date on the recording computer system (and therefore, match the date in the audio file names). It may not match, however, due to an inaccurately set computer clock. This is not critical, since this date automatically can be corrected when the audio associated with these log notes is available later for review in conjunction with the log notes.

It also should be noted that the time stamps which are added for each log note represent the system time of the local computer. These time stamps very well may be different from the time stamps which are made in conjunction with the audio recording. The variance in time between the log notes and the actual recording may range from a few minutes or seconds, due to inaccurately set computer clocks, to as much as several hours in the case of the user traveling from some other geographic location to the one in which the recording is being made. In any event, the time stamps also can be updated automatically later when the audio is played on a computer in conjunction with the log notes for subsequent review. The manner in which this synchronization is effected is covered in a subsequent section.

Creating a Log Sheet and Notes for Audio Previously Recorded

The situation here again is very similar to the original one described when the log notes are created in conjunction with the recorded audio. In this case, a previously recorded audio is loaded into the playback panel on a local system where the log notes is being used to create the new log sheet. A situation of this type may occur when an attorney receives audio from a proceeding that took place previously; and the attorney desires to review the proceedings and concurrently take associated notes for summarizing purposes.

The manner in which this is done is that the system is initiated and the subject audio is loaded in the playback panel for playback under control of the panel operation described previously in conjunction with FIG. 3. The log note panel then is opened, again as described previously. A new blank log sheet of the type illustrated in the lower half of FIG. 6 is displayed; and the log notes application automatically queries the playback panel for the location label and date of the loaded audio to add to the new log sheet. The correlation between the log sheet and the identification in Field 85 of the playback panel is effected in the same manner as effected in conjunction with the Field 54 of the recording panel when the log sheets are being produced on the same computer as the recording. In this case, the log sheets are being produced on the same computer as the playback; and the date and location information is transferred to the log sheet. Again, the optional description field 154 may be used to add specific text identifying what the contents of the log sheet are all about.

At this point, the user may enter new log notes into the log sheet, based on the current playback time of the loaded audio. This occurs automatically because the log sheet now is synchronized with the audio. At the moment the user enters a note, a time stamp immediately and automatically is inserted in the time field 160 of the particular note, in the same manner described above in conjunction with FIG. 6. It should be noted, however, that unlike the scenario with recording audio, the time reflects the current playback time displayed in the playback panel 88 (FIG. 3). The time entered is not the actual time at which the log note may be entered. The time is completely controlled by the playback time, as displayed on the playback panel 88. Notes can be added against any playback point and at any time; and they automatically are inserted such that they are listed in chronological order within the log sheet.

Reference should be made to FIG. 12 for the information flow for accomplishing this purpose. Again, as described previously, the log sheet is started at 300 and the decision diamond is made at 302 as to whether this is to be opened as an existing log sheet or not. In the situation under discussion here, no existing log sheet exists; so the next decision is at 304 as to whether notes are to be entered against existing audio. The answer to this question is "yes", since the audio already exists. The decision is made at 340 as to whether the audio is on the system or not. In the situation under discussion, the answer is "yes", and the audio is located as described previously; and the location name and date are synchronized between the log sheet and the audio at 344. At this point, the system operates in the same manner as described previously as to the decision whether to enter a new note or not at 310. If a note is entered it is done at 312; and the dynamic time stamp is inserted against the note at 314. The time stamp here, however, is derived from the current audio playback time as described previously.

Reviewing Audio Using an Existing Log Sheet

Once a log sheet has been created as described in the different situations above, the sheet and notes contained can be used to review or navigate the corresponding audio. To open an existing log sheet, the user performs a search using the search interface shown in FIG. 9. This interface is displayed on the screen 45 of the computer 47; and different fields are entered to initiate the search. Searches may be performed on all log sheets contained within a user-selected directory. They can be made on text contained in the description field 202, location label 206, date ranges 208, and/or text contained within the individual log notes at 204. Once the search is invoked, all log sheets which meet that search criteria are listed in the search interface. The user then can select the desired log sheet from the list to open.

Once an existing log sheet is opened, the user can click on any time stamp in the notes, which will automatically start the audio playback at the precise point (illustrated in FIG. 3), if it is already loaded in the playback panel, and cause the corresponding audio to be loaded automatically within the playback panel, if it is not already loaded. The corresponding audio is identified by a match of the location label and the date found in the log sheet, which is reproduced in the form shown in FIG. 5. The location label and date are embedded in the audio file names, as previously described in the "recording" sub-section above.

The automatic loading of the audio for the playback panel is dependent upon the audio existing in a drive/path location of the system described above mentioned co-pending application. Specifically, the system of that application maintains a list of drive/paths where it will "look" for audio when a request is made. This could include a recordings folder on the hard drive, a CD-ROM connected to the local system, a network drive location, or even a server or content manager database. This list can be modified by the user. In the event that audio cannot be found in the drive/path locations, the user is given the opportunity to manually browse for the audio.

When a specific log note time stamp is identified by placing a cursor over it and then left-clicking the mouse, on the log sheet, the current play time in the playback panel corresponding to that time of the log sheet automatically jumps to the time selected in the time stamp of the log sheet. As a consequence, the particular audio associated with the note immediately can be played. This is an advantage of the digitally recorded audio over the previously time consuming and cumbersome rewinding and fast-forwarding of magnetic tapes.

Because a log sheet can include many note field entries, the software provides the ability for the user to search for strings of text within the log sheet to locate specific occurrences of the text. For example, an exhibit number could be entered as the search string from the text note field 164; and then every occurrence of that number which exists in the log sheet rapidly is located and highlighted. The desired highlighted portions then can be identified by the cursor and clicked upon to cause the playback correlating to the time stamp for that log note to be effected in the playback of the audio.

Associating Log Sheets with Audio

As referenced in the foregoing sections, there may be situations where the log sheets, such as the log sheet of FIG. 5, do not reflect the location label and date from the associated audio, which is the information required in order to effect a dynamic link between the audio and the log sheets. When this is the case, the log sheet and the audio must be associated with one another.

The location label and date embedded in the audio files are considered fixed. These are not changed. When a log sheet is to be associated, the location label and date from the audio files must be passed to the log sheet and inserted into the fields 156 and 158, so that the log sheet will operate in conjunction with the audio.

Figure 10:
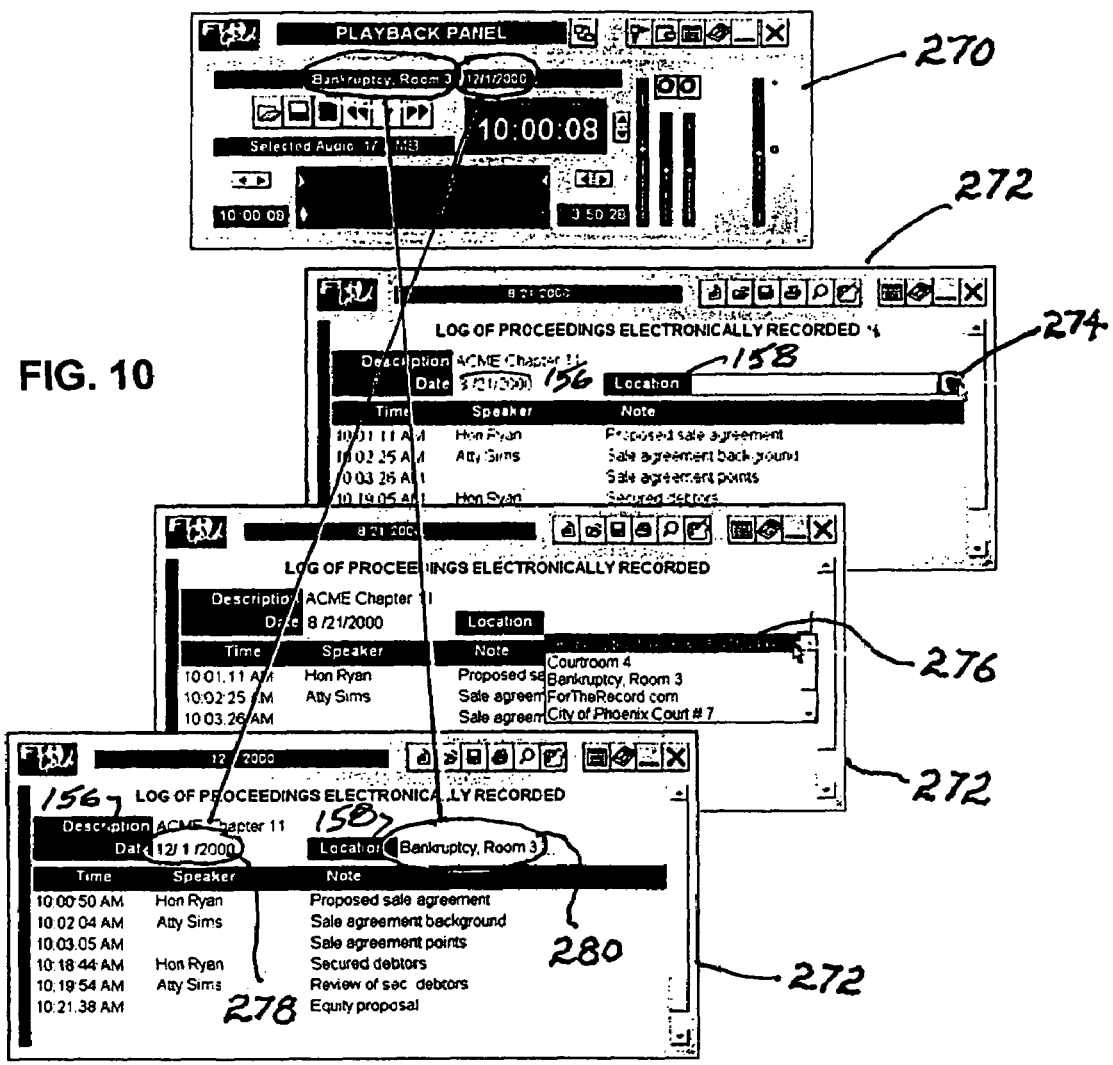
FIG. 10 shows multiple images of panels as displayed on the personal computer monitor for associating a specific log sheet with audio.

Reference now should be made to FIG. 10 for the sequence of associating the log sheet with the correct corresponding audio. First, the log sheet is opened into the file and the audio is manually loaded into the playback panel (upper screen of FIG. 10). At this point, clicking the small "down" arrow 274 on the right of the location field 158 in the log sheet 272 (second screen of FIG. 10) reveals a drop down list which includes the location label and date from the audio currently loaded in the playback panel (third screen of FIG. 10). This is indicated at 276 of the log sheet 272 in the panel overlay sequence of FIG. 10. Selecting this entry then automatically inserts the location label and date into the positions 280 and 278, respectively, in the corresponding fields 158 and 156 in the log sheet 272, as illustrated in the bottommost panel of FIG. 10. At this point, the log sheet 272 then is correctly associated with the audio. This activates the time stamps in the notes; and this linking of the log sheet to the audio will exist any time the log sheet subsequently is opened in future sessions.

Synchronizing Notes with Audio

As referenced in previous sections, there may be situations when the time stamps in the field 160 of the log sheets do not reflect the correct time at which each note was created, relative to the audio with which it is associated. As mentioned previously, this may happen when an attorney creates a log sheet during a proceeding being recorded, and his/her computer system time does not match that of the recording system. Although the relative times between the different time stamps on the log sheet and the audio will be accurate, the times reflected by the time stamp on the log sheets will be either earlier or later, relative to the audio. In any event, when this situation exists the time stamps in the log sheet may be readily synchronized with the actual time of the audio.

Figure 11:
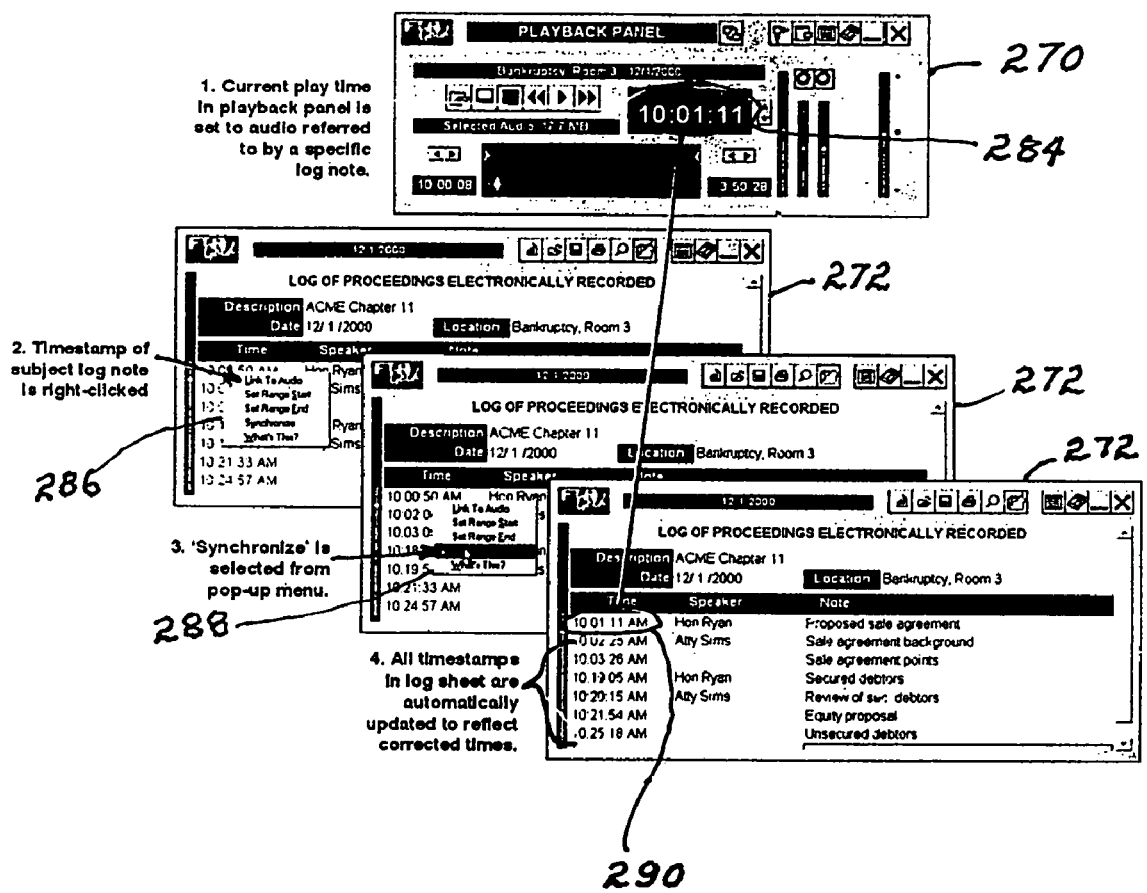
FIG. 11 shows multiple images of panels as displayed on the personal computer monitor for synchronizing the times in log notes with the correct playback times of a digital audio recording made on a computer different from the one in which the log notes were entered.

The synchronization of the notes is outlined in FIG. 11. It is performed by referencing one note in the log sheet, for example the uppermost note (although it could be any one note). The referenced audio then is located in the playback panel (270 of FIG. 11). Once the audio has been found, playback is stopped; and the current play time marker at 284, at the precise location where the note reference is desired, is displayed. The time stamp of the desired note is then right-clicked over by the mouse; and a selection is made from the menu at 286 to select "SYNCHRONIZE" from the pop-up menu. This results in the time stamp changing or relating the time to the current play time marker position displayed in the panel 284 on the playback panel. This also updates or changes all other time stamps in the log sheet relatively, as shown on the link between the uppermost panel display of FIG. 11 and the lowermost one at 290. An examination of the log note times in the middle two displays of the hierarchal sequence in FIG. 11 shows that the time stamp of the uppermost log note display was changed from 10:00:50 AM to 10:01:11, and all other notes are accordingly adjusted; so that the log notes now are in full synchronization with the playback with which they are associated.

This is illustrated in FIG. 12 where after determining whether the audio is on at the system at 340, a decision, either at 342 or 344, places the operation at 310. Since no new notes are to be entered, the question is whether a modified existing note is to be made. The answer is "no"; so that the next question is whether to perform a search on the notes at 320. Again, the answer is "no" to proceed to the question "SELECT AUDIO HYPERLINK" at 324. Once again, the answer is "no"; and the decision is made at 328 to sync the log sheet and notes to the audio. The answer to this is "yes"; and the synchronization is effected at 330, as described above. Now the system loops back to the "ENTER NEW NOTE" decision at 310 for subsequent operation.

FIG. 12 also illustrates other options in addition to the various sequences mentioned above. For example, following the sequence for synchronizing the log notes, if no synchronization is to take place and a new log note sheet is to be created based on an existing audio, that decision is made at 332; and a new sheet is created at 334. The system then loops back to the decision diamond at 310 for further operation.

As mentioned previously, the generation of these log notes in conjunction with the preferred embodiment of the invention may be utilized with systems other than the system of the above referenced co-pending application; although ideally it is designed for operation with that system. The log note system itself allows rapid and accurate notes to be taken which may be correlated with any proceeding in which a time stamp is made. The log notes may be correlated in the present system with a written record carrying time stamps where that written record is made from digitally recorded audio proceedings, or from proceedings which are recorded in a conventional manner by a court reporter. So long as the transcript carries time references on its margins, log notes separately made may be correlated with the references in the transcript.

The foregoing description of the preferred embodiment of the invention should be taken as illustrative, and not as limiting. Various changes and modifications will occur to those skilled in the art for performing substantially the same function, in substantially the same way, to achieve substantially the same result, without departing from the true scope of the invention as defined in the appended claims.

What is claimed is:

1. A system for creating and entering log notes each time-linked to the recording times of a digital audio transcription record, including in combination:
   a) at least one selected source of digitally recorded audio signals;
   b) a computer including a memory for storing the digitally recorded audio signals and for allowing the stored digitally recorded audio signals to be played back, the digitally recorded audio signals associated with a running time corresponding to the times at which each of the audio signals were recorded;
   c) the computer including a memory for storing digital signals corresponding to the specific individual log notes time linked to the digitally recorded audio signals, the computer associating a time stamp corresponding to the actual recording time of each of the log notes;
   d) a display coupled to the computer, with the computer allowing the display to indicate file entries corresponding to the digitally recorded audio signals and corresponding to the log notes associated with unique file entries corresponding to the digitally recorded audio signals;
   e) a play-back selection means associated with the computer allowing a user to play a desired file entry of digitally recorded audio signals associated with the corresponding log notes;
   f) the computer being responsive to the play-back selection means for effecting the playing of the digitally recorded audio signals corresponding to the selected file entry; and
   g) means responsive to selection by a user of a specific associated log note for effecting a time link of the time stamp associated with the selected log note to the running time of the digitally recorded audio signal and for automatically causing playing of that portion of the digitally recorded audio signal corresponding to the selected log note.

2. The system according to claim 1 further including means for automatically linking the time stamps of the log notes with the corresponding running time of the digitally recorded audio.

3. The system according to claim 2 wherein the means for linking the time stamp of the log notes with the corresponding file entry for the digital audio signals operates in response to specific identifying indicia for the log notes corresponding to the file entry with which the log notes are associated.

4. The system according to claim 3 further including means for synchronizing the time stamps of all log notes associated with a specific file entry in response to selection of a specific log note linked to a current play time of a portion of a digitally recorded audio recording causing the time stamps of all of the log notes associated with the file entry for that recording to be changed and synchronized with the selected recording.

5. The system according to claim 4 wherein selection of a specific log note time stamp by a user causes the playing of the corresponding digitally recorded audio signals to automatically jump to the running time linked to the selected time stamp to permit playing of the particular audio signals associated with the log note time stamp.

6. The system according to claim 5 wherein the digital signals corresponding to specific individual log notes further include file identification indicia.

7. The system according to claim 6 wherein the digital signals corresponding to specific individual log notes stored in the memory of the computer further include location information indicating the location at which a recording corresponding to the log notes was made.

8. The system according to claim 3 wherein selection of a specific log note time stamp by a user causes the playing of the corresponding digitally recorded audio signals to automatically jump to the running time linked to the selected time stamp to permit playing of the particular audio signals associated with the log note time stamp.

9. The system according to claim 8 wherein the digital signals corresponding to specific individual log notes stored in the memory of the computer also include the date on which such log notes were recorded.

10. The system according to claim 1 wherein the digital signals corresponding to specific individual log notes stored in the memory of the computer also include the date on which such log notes were recorded.

11. The system according to claim 1 further including means for synchronizing a date and the time stamps of all log notes associated with a specific file entry in response to selection of a specific log note linked to a current play time of a portion of a digitally recorded audio recording causing the time stamps of all of the log notes associated with the file entry for that recording to be changed and synchronized with the time of the selected recording.

12. The system according to claim 1 wherein selection of a specific log note time stamp by a user causes the playing of the corresponding digitally recorded audio signals to automatically jump to the running time linked to the selected time stamp to permit playing of the particular audio signals associated with the log note time stamp.

13. The system according to claim 1 wherein the digital signals corresponding to specific individual log notes further include file identification indicia.

14. The system according to claim 1 wherein the digital signals corresponding to specific individual log notes stored in the memory of the computer further include location information indicating the location at which a recording corresponding to the log notes was made.

15. The system according to claim 1 wherein said digitally recorded audio signals comprise at least one file having at least one file attribute which includes the start time at which the digitally recorded audio signals were first recorded.

16. The system according to claim 1 wherein said digitally recorded audio signals comprise at least one file having a unique file name which includes the start time at which the digitally recorded audio signals were first recorded.

17. A system for creating and entering log notes correlated in real time to a transcription record, including, in combination;
   a) at least one selected source of recorded signals, the recorded signals associated with a date and a running time corresponding to the time at which the signals were recorded;
   b) a computer including a memory for storing digital signals corresponding to specific individual log notes time linked to the running time of the recorded signals, the computer associating a time stamp with the recording of each of the log notes;
   c) a display coupled to the computer with the computer allowing the display to indicate file entries of the recorded signals and corresponding to the log notes associated with a unique file entry corresponding to the recorded signals;
   d) a selection means associated with the computer allowing a user to select a desired file entry from a list of file entries associated with the corresponding log notes;
   e) means for correlating log notes corresponding to a specific file entry; and
   f) means responsive to selection by a user of a specific log note for automatically causing the computer to locate that portion of the recorded signal time linked to the time stamp of the selected log note.

18. The system according to claim 17 further including means for automatically linking the time stamps of the log notes with the corresponding running time of the recorded signals when the same computer recording the signals is used simultaneously for storing digital signals corresponding to the specific individual log notes.

19. The system according to claim 18 wherein the means for correlating the log notes with the corresponding file entry for the recorded signals operates in response to specific identifying indicia for the log notes corresponding to the file entry with which the log notes are associated.

20. The system according to claim 17 further including means for synchronizing a date and the time stamps of all log notes associated with a specific file entry in response to selection of a specific log note linked to a current time of a portion of recorded signals causing the time stamps of all of the log notes associated with the file entry for that recorded signal to be changed and synchronized with the time of the recorded signals.

21. The system according to claim 17 wherein the digital signals corresponding to specific individual log notes further include file identification indicia.

22. The system according to claim 21 wherein the file identification indicia is location information indicating the location at which a recording corresponding to the log notes was made.

23. The system according to claim 17 wherein the file identification indicia includes the date on which such log notes were recorded.

24. The system according to claim 17 wherein the means for correlating the log notes with the specific file entry for the recorded signals operates in response to specific identifying indicia for the log notes corresponding to the file entry with which the log notes are associated.

25. The system according to claim 17 wherein the digital signals corresponding to specific individual log notes stored in the memory of the computer further include location information indicating the location at which a recording corresponding to the log notes was made.

26. A system for correlating a record of events occurring over time to recorded signals associated with a running time, including in combination:
   a) at least one selected source of recorded signals associated with a running time corresponding to the time at which the signals were recorded;
   b) a computer including a memory for storing digital signals corresponding to a record of events linked to the running time of the recorded signals, the computer associating a time stamp of the record of events with the stored digital signals of the record of events;
   c) means for linking the time stamp of the record of events with the running time of the recorded signals; and
   d) means responsive to selection by a user of a specific portion of a record of events for automatically causing the computer to locate the running time of that portion of the recorded signals linked to the time stamp of the selected portion of the record of events.

27. The system according to claim 26 further including means for automatically linking the time stamps of the record of events with the corresponding running time of the recorded signals when the same computer stores the recorded signals and simultaneously stores digital signals corresponding to the record of events.

28. The system according to claim 27 wherein the means for linking the time stamps of the record of events with the corresponding running time of the recorded signals operates in response to specific identifying indicia for the record of events corresponding to the file entry with which the record of events are associated.

29. The system according to claim 26 further including means for synchronizing a date and the time stamps of all record of events associated with the recorded signals in response to selection of a specific portion of a record of events linked to a current time of a portion of the recorded signals causing the time stamps of all of the record of events associated with that recorded signal to be changed and synchronized with the running time of the recorded signals.

30. The system according to claim 26 wherein the digital signals corresponding to specific individual record of events further include file identification indicia.

31. The system according to claim 26 wherein the digital signals corresponding to specific individual record of events stored in the memory of the computer further include location information indicating the location at which the recorded signals corresponding to the record of events was made.

32. The system according to claim 26 wherein the digital signals corresponding to specific individual record of events stored in the memory of the computer also include the date on which the record of events was stored.

* * * * *

UNITED STATES PATENT AND TRADEMARK OFFICE
CERTIFICATE OF CORRECTION

PATENT NO.       : 7,617,445 B1                                    Page 1 of 1
APPLICATION NO.  : 11/223342
DATED            : November 10, 2009
INVENTOR(S)      : Townsend et al.

It is certified that error appears in the above-identified patent and that said Letters Patent is hereby corrected as shown below:

The following item was omitted from column 1, line 19 from the Title page of the issued patent Related U.S. Application Data
(63) Continuation of application No. 09/809,869 filed on Mar. 16, 2001.

Signed and Sealed this

Ninth Day of February, 2010

David J. Kappos
*Director of the United States Patent and Trademark Office*